Sept. 30, 1952 O. E. ANDRUS Re. 23,559

CORROSION-RESISTANT METALLIC STRUCTURE

Original Filed April 6, 1935

INVENTOR
Orrin E. Andrus

BY Andrus & Sceales

ATTORNEYS

Patented Sept. 30, 1952 Re. 23,559

UNITED STATES PATENT OFFICE 23,559

CORROSION-RESISTANT METALLIC STRUCTURE

Orrin E. Andrus, Shorewood, Wis., assignor to A. O. Smith Corporation, Milwaukee, Wis., a corporation of New York Original No. 2,267,361, dated December 23, 1941, Serial No. 15,146, April 6, 1935. Renewed November 29, 1937. Application for reissue August 25, 1952, Serial No. 306,140

8 Claims. (Cl. 204—196)

Matter enclosed in heavy brackets [ ] appears in the original patent but forms no part of this reissue specification; matter printed in italics indicates the additions made by reissue.

This invention relates to corrosion-resistant metallic structures and has been applied to underground pipe lines such as are used for the transmission of gas or oil or water.

The principal object of the invention is to provide a metallic structure which is resistant to corrosion from the medium contacting therewith.

Another object of the invention is to provide an underground pipe line resistant to the action of corrosive agencies present in the soil.

Difficulty has been experienced in the past due to the corrosion of the pipe and, as a consequence, various expedients have been proposed for the purpose of protecting underground pipe lines or other underground structures. In some cases, a pipe line with bare metallic surfaces buried directly in contact with the soil has been connected to the negative terminal of a source of low voltage direct current, while the positive terminal of the current source has been connected to an anode buried in the ground at a suitable distance from the pipe. The pipe line was thus maintained at a negative potential with respect to its surroundings. The cathodic protection which was provided in this way was partially effective in reducing the corrosion of the pipe line, but large currents were necessary to adequately protect a structure with bare metallic surfaces buried directly in contact with the soil, and as a consequence of the need for the provision of large currents, the cathodic protection of bare pipe lines was expensive in first cost and in maintenance and operation.

Galvanized pipe has also been used, but because of the large expanse and thinness of the zinc coating it is soon consumed and no longer protects the underlying base metal.

It has also long been the practice to provide pipe with a coating of coal tar pitch or asphalt or similar material to protect the pipe from corrosion. While considerable protection can be afforded to the pipe by such coatings, it is extremely difficult to provide a coating which is so free from defects that no opportunity for localized corrosion is provided.

In order to protect those parts of the pipe which are exposed by defects in the coating, cathodic protection has been applied to pipes provided with coverings of pitch or asphalt or similar materials, the theory being that a covering of this kind will electrically insulate the pipe from the ground and that a much smaller current will suffice than is required when bare metallic surfaces are buried directly in contact with the soil. My experience has been, however, that coatings of such materials do not possess the necessary properties to permit them to be used successfully for long periods of time in combination with cathodic protection of those parts of the pipe which are exposed to corrosive influences by defects in the coating. While such coatings may, when first installed, have an electrical resistance which greatly decreases the current consumption below what would be required for the cathodic protection of an uncoated pipe line, it is found that the resistance of the coating decreases in the course of time and that an increasingly larger current is required when the pipe line is kept at the same negative potential with respect to its surroundings. The decreased resistance is in part due to the absorption of moisture and electrolyte from the soil, but whatever the cause it results in an increased current consumption. For the most part, this increased current is uselessly expanded in leaking through that part of the covering which is free from gross mechanical defects and which might in itself adequately protect the pipe line against corrosion even though the coating were low in electrical resistance. In the limiting case when the electrical resistance of the coating falls to almost zero, the current taken from the current source will be nearly the same as that required to cathodically protect an uncoated pipe line.

An even more serious drawback to the use of cathodic protection in combination with pipes provided with coatings of asphalt, tar, or bituminous materials, is brought about by the effect which is exerted upon the coating by the electric current used to cathodically protect those parts of the pipe which are exposed by defects in the coating. The electric current passing through the defective spots in the coating protects the underlying metal from corrosion, but results in the liberation of hydrogen. The hydrogen liberated at the cathode as a result of electrolysis develops a hydrogen pressure which increases as the current and the rate of liberation of hydrogen increase. A certain minimum difference of potential is required between the soil and the pipe in order that the pipe may be cathodically protected from corrosion, and even this minimum potential difference results in currents through defective spots and conductive areas of sufficient magnitude to build up a hydrogen pressure which punctures or loosens coatings of asphalt, tar or bituminous materials.

In other words, the use of an electric current to cathodically protect the parts of the pipe which are exposed by defects in such coatings, results in a gradual enlargement of the defects which require protection.

The same effect is also found to some extent even where the coating is originally free from defects. As the coating has only a finite resistance at best, and one which decreases due to the absorption of water and electrolyte from the soil, there is a gradual increase in the current which passes through the covering even where it completely covers the metal. The increased current results in an increased hydrogen pressure which ultimately attains a value sufficient to separate the coating from the metal and to create in the coating a defect where none existed before. Due to this action, there is a gradual deterioration from an initial condition in which the major portion of the pipe is protected from corrosion by the coating and only an insignificant portion by the electric current, towards a final condition in which the coating is ruined by the continued action of the current, and such protection as may still be afforded to the pipe line is furnished almost entirely by the current.

These difficulties are avoided by the use of this invention. According to the invention, the pipe or other metallic article is provided with a coating of vitreous enamel on those surfaces which are exposed to corrosive agencies. The metal portion of the article is connected to the negative terminal of a low voltage source of unidirectional current which may be a battery, a low voltage alternating current transformer associated with a suitable rectifier, a direct current generator, or other current source capable of supplying unidirectional current. The positive terminal of the current source is connected to an anode buried in the ground in the vicinity of the pipe or article to be protected from corrosion.

Alternatively, the steel base of the pipe line may be connected to an anode which is made of zinc or of other metal more active than iron and is buried in the ground on or near the pipe line. No other source of current need be provided in this case since if a defect exists in the enamel coating of the pipe, a battery will be formed with the steel or iron of the pipe line acting as the cathode and the zinc as the anode. The pipe line will be protected from corrosion while the anode is being slowly consumed.

*The invention is illustrated in the accompanying drawing in which:*

Figure 1:
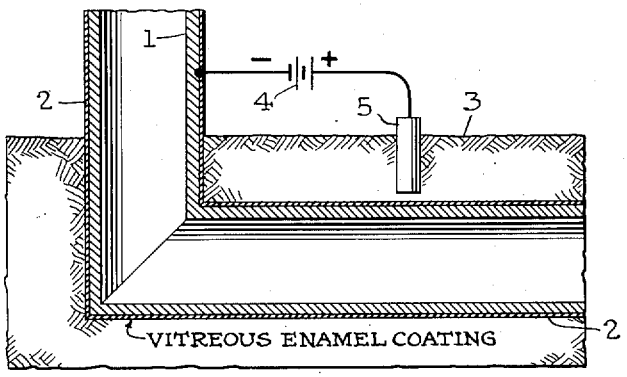
*Figure 1 is a diagrammatic view showing the application of a source of current to a metallic structure coated with vitreous enamel and submerged underground; and*

*In the drawing the metallic structure 1 has a protective vitreous enamel coating 2 and extends in the ground or other corroding medium 3.*

*In Figure 1 the structure 1, which may be a pipe line, is made cathodic by connecting the same to the negative terminal of a battery 4 or other suitable low voltage source of direct current. The positive terminal of battery 4 is connected to an anode 5 submerged in the ground in the vicinity of the structure.*

Figure 2:
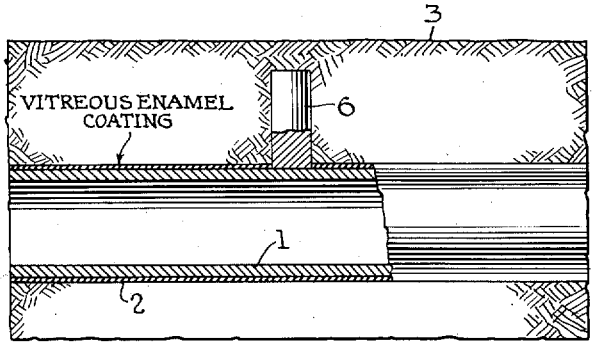
*Fig. 2 is a similar view showing the use of an anode of zinc or other metal more active than iron to protect a steel pipe line underground.*

*In Figure 2 the structure 1, represented as a pipe line, is made cathodic by securing thereto an anode 6 of zinc or other metal more active than iron and submerged in the ground with the structure.*

Figure 3:
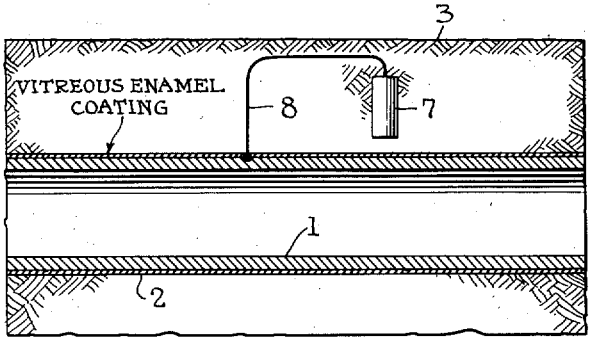
*Fig. 3 is a view similar to Figure 1 and shows the use of an anode more active than iron connected to a pipe line by an electrical conductor.*

*In Figure 3 the structure 1, represented as a pipe line, is made cathodic by connecting thereto anode 7 of zinc or other metal more active than iron, by an electrical conductor 8.*

My tests show that a vitreous enamel coating applied to a steel pipe which is buried underground, maintains a high electrical resistance and is substantially unaffected by water. Furthermore, the bond between the vitreous enamel and the steel pipe is such that the hydrogen pressure developed at defective spots in the enamel is insufficient to puncture the enamel coating or to separate it from the steel base and enlarge the defect. The enamel coating is highly adherent to the steel base, expands or contracts with the steel base as it changes in dimensions due to changes in temperature or applied forces, and is capable of surviving soil stress effects without damage to its protective properties. The enamel coating alone provides almost complete protection of the pipe from corrosion, and protection which is permanent. Because of the constant high electrical resistance of the enamel coating, only a small electric current is needed to supply a long length of a pipe line maintained negative with respect to its surroundings, and to cathodically protect from corrosion those portions of the metal which are exposed by the few defects that are likely to occur in any coating, no matter how carefully it is applied.

Furthermore, the properties of the enamel coating are such that the cathodic protection of metallic areas exposed by defects in the coating is obtained without enlargement of the defects or damage to the coating. A permanently protected pipe line is provided, and the difficulties of prior methods are substantially eliminated or entirely avoided.

An advantage of the constant high electrical resistance of the enameled covering is that an anode buried in the ground a few hundred feet from the pipe line will permanently protect a much greater length of pipe line from corrosion than would be the case if the coating were of such a nature as to decrease in electrical resistance. Under some conditions, one anode will protect the pipe line for a distance of some five miles on either side. This distance will, of course, depend upon the soil conditions which are encountered, but in any case, the use of enameled pipe will enable the anodes to be spaced more widely along the line than when a line similar in other respects is coated with a composition which decreases in electrical resistance. A further advantage of the permanent character of the properties of a vitreous enameled line in combination with cathodic protection is that the requirements in the way of anodes and current sources to supply the current between the anode and the line can be estimated in advance and will require no extensive additions in the course of time to take care of deterioration in the covering.

In general, the voltage which is used should not be materially greater than is necessary to protect the pipe against corrosion since the use of a needlessly high voltage merely results in a useless expenditure of electrical energy. Experience has shown that the voltage applied between the pipe and the anode should be such that the potential difference between the pipe and a copper sulphate electrode in contact with the ground is about 0.8 to 1.2 volts.

I claim:

1. A corrosion-resistant metallic structure which comprises a metal base, a coating of vitreous enamel fused to the metal base, and means to maintain the metal structure electrically negative with respect to its surroundings in order to cathodically protect from corrosion those parts of the metal base which are exposed by defects in the coating.

2. A corrosion-resistant underground metallic structure which comprises a metal base, a coating of vitreous enamel fused to the metal base, a source of low voltage unidirectional electric current, an electrical connection between the metal base and the negative terminal of the source of unidirectional electric current, and an anode which is electrically connected to the positive terminal of the current source and which makes electrical contact with the ground in the vicinity of the underground metallic structure.

3. A corrosion-resistant underground pipe line which comprises steel pipe, a coating of vitreous enamel fused to the steel pipe, and a source of unidirectional electric current with its negative terminal connected to the steel pipe and its positive terminal connected to an anode which makes contact with the ground in the vicinity of the underground pipe line.

4. A corrosion-resistant underground pipe line which comprises steel pipe, a coating of vitreous enamel fused to the steel pipe, and means to maintain the pipe electrically negative with respect to its surroundings in order to cathodically protect from corrosion those parts of the pipe which are exposed to the action of corrosive agencies by defects in the enamel coating.

5. A corrosion-resistant underground metallic structure which comprises a metal base, a coating *of vitreous enamel* applied to said base, said coating being resistant to the action of corrosive agencies present in the soil and of high electrical resistance, and being so firmly bonded to the metal base as to remain undetached therefrom by the hydrogen pressure developed when an electric current passes from the surrounding soil into the metal base through defects in its coating, and means for maintaining the metallic structure electrically negative with respect to its surroundings in order to cathodically protect from corrosion those parts of the structure which are not protected by the coating.

6. A corrosion-resistant underground metallic structure which comprises a metal base, a coating of vitreous enamel fused to the metal base, and an anode of metal more active than the metal base, said anode being buried in the ground in the vicinity of the underground metallic structure and electrically connected to the metal base by means of an electrical conductor.

7. A corrosion-resistant pipe line which comprises a steel pipe, a coating of vitreous enamel fused to the steel pipe, and a zinc anode buried in the ground in the vicinity of the pipe line and electrically connected to the steel pipe.

8. A corrosion-resistant metallic structure which comprises a metal base, a coating of vitreous enamel fused to the metal base, and an anode of metal more active than the metal base, said anode being exposed to the medium contacting said base and electrically connected to the metal base by means of an electrical conductor.

ORRIN E. ANDRUS.

REFERENCES CITED

The following references are of record in the file of this patent or the original patent:

UNITED STATES PATENTS

| Number | Name | Date |
|---|---|---|
| 952,077 | Lutz | Mar. 15, 1910 |
| 989,596 | Geppert | Apr. 18, 1911 |
| 1,269,926 | Gesell | June 18, 1918 |
| 1,366,257 | Gush | Jan. 18, 1921 |
| 1,463,461 | Davis | July 31, 1923 |
| 1,664,800 | Mills | Apr. 3, 1928 |
| 1,842,298 | Smith | Jan. 19, 1932 |
| 1,871,508 | Gardner | Aug. 16, 1932 |
| 1,910,044 | Parker | May 23, 1933 |
| 1,958,765 | Perkins | May 15, 1934 |

FOREIGN PATENTS

| Number | Country | Date |
|---|---|---|
| 210,055 | Great Britain | Dec. 11, 1923 |
| 408,799 | Germany | Jan. 30, 1925 |

OTHER REFERENCES

"Transactions of The American Electrochemical Society," pre-print 64–13 (1933), pages 146, 147.

"Proceedings of The American Petroleum Institute," vol. 14 (Nov. 1933), section 4, pages 152 and 166.